Sept. 29, 1970     L. R. CONRATH     3,530,572
METHOD OF ASSEMBLING A SOLENOID
Filed May 3, 1968     2 Sheets-Sheet 1
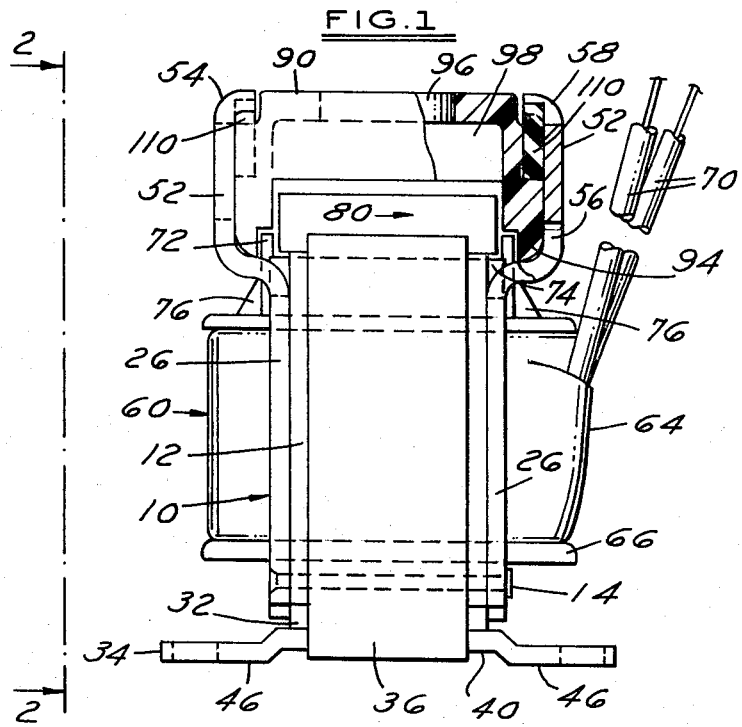
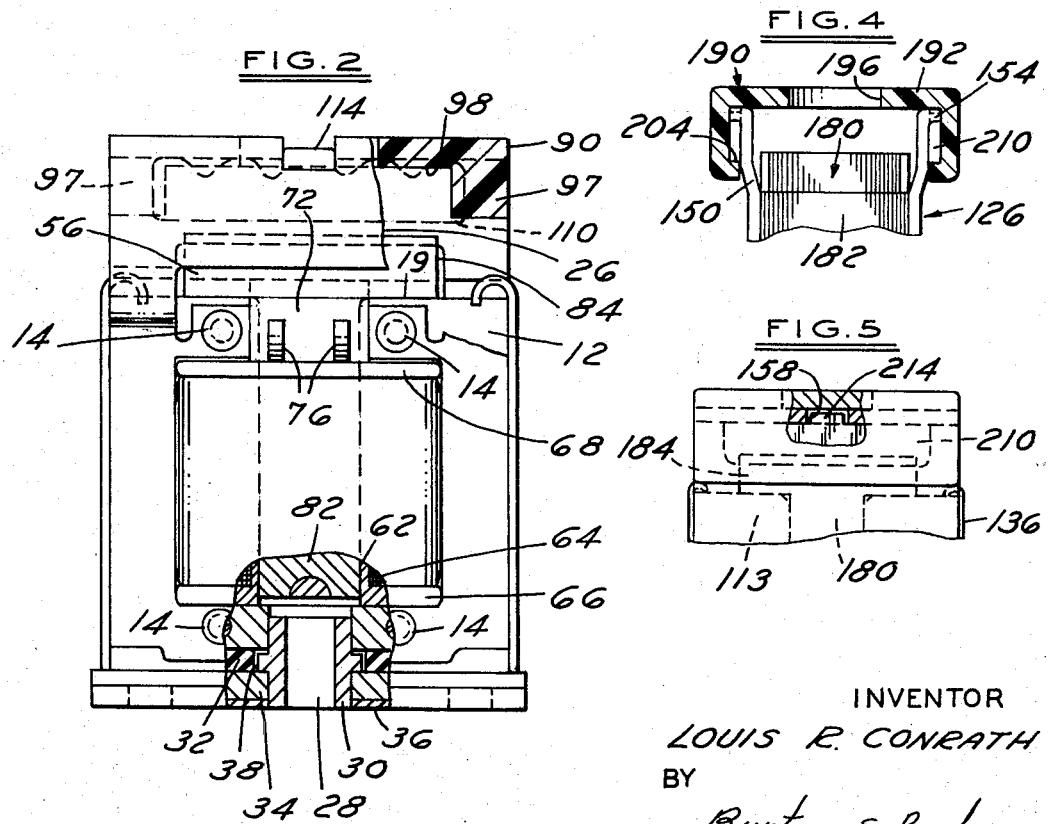
INVENTOR
LOUIS R. CONRATH
BY
*Burton & Parker*
ATTORNEYS

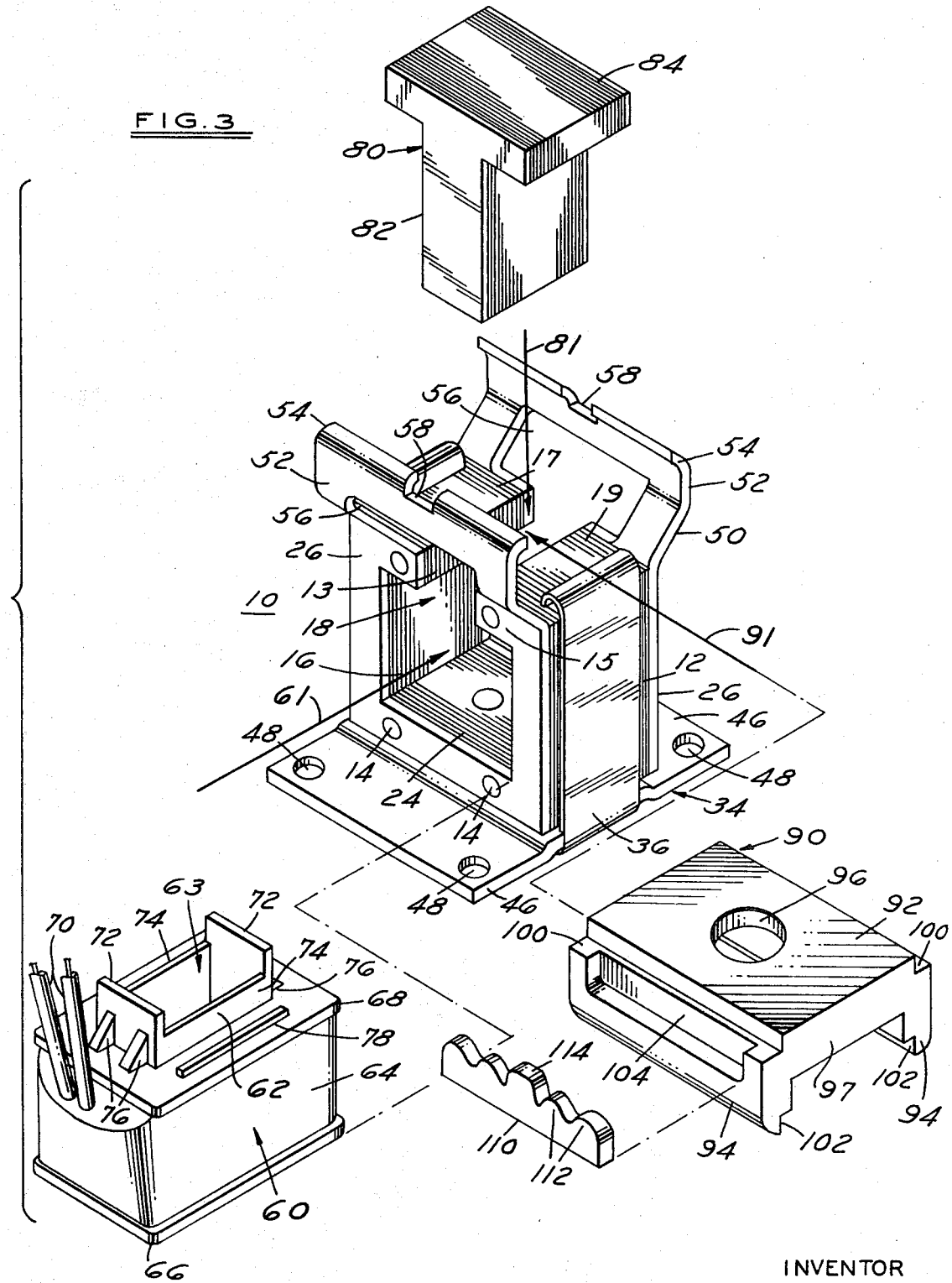

United States Patent Office 3,530,572
Patented Sept. 29, 1970

3,530,572
METHOD OF ASSEMBLING A SOLENOID
Louis R. Conrath, Huntington Woods, Mich., assignor to Detroit Coil Company, Ferndale, Mich., a corporation of Michigan
Filed May 3, 1968, Ser. No. 726,291
Int. Cl. H01f 7/06
U.S. Cl. 29—602
8 Claims

ABSTRACT OF THE DISCLOSURE

This disclosure relates to methods of assembling solenoids wherein the backstop member is slid between the side plates and locked there so as to resiliently cushion the plunger when the solenoid is de-energized.

BACKGROUND OF THE INVENTION

The present invention relates particularly, though not exclusively, to industrial solenoids and more particularly to improvements in solenoids of the type illustrated and described in U.S. Pats. 2,671,187 and 2,665,397 of common ownership herewith. Such patents show a well known push type industrial solenoid wherein a T-shaped plunger is operatively associated at the end opposite its head with a push pin for shifting the valve or other device to be actuated when the solenoid is energized. This type solenoid is provided with a backstop for absorbing the shock and limiting outward movement of the plunger when the solenoid is de-energized. The backstop is carried by a pair of side plates secured to opposite sides of the stator, the construction being such that assembly of the backstop to the stator requires the side plates to be bolted to the stator after the backstop is connected to the plates.

The present invention has for its general object the provision of an improved solenoid wherein the major components are detachably secured together into an operative unit though the side plates are permanently secured to the stator prior to assembly of the coil, plunger and backstop with the stator.

A related object is to provide a solenoid of the above character the components of which are assembled in and maintained in proper operating condition and position relative to each other by the components themselves.

Another object is the provision of a solenoid wherein the side plates for supporting the backstop and the laminations comprising the stator may be secured together at the same time in one operation and by the same fastening means, such that the side plates become and remain an integral part of the stator structure, and wherein the backstop and side plates are so designed that the backstop may be inserted in position between the side plates and is self-locking in its operative position.

Another object is the provision of an improved solenoid construction wherein the backstop may be assembled in self-locking operative relation with the side plates by resilient elements between the side plates and backstop which also serve to absorb the shock of impact of the plunger against the backstop.

A further object is the provision of a solenoid wherein the coil, plunger, and backstop are held in operative relation by an interfitting self-locking relation of such parts with themselves and the stator structure.

Another object is to provide a solenoid type of electromagnet having a plunger backstop member and a magnetizing coil either or both of which may be readily removed from the solenoid assembly without disassembly of the stator frame structure thereof.

SUMMARY OF THE INVENTION

A solenoid constructed in accordance with the invention includes as its major operating elements a coil, a stator or core frame structure embracing the coil and an armature or plunger extending through one end of the core for reciprocation within the coil. The stator includes as an integral part thereof a pair of side plates extending beyond the pole faces of the stator, which side plates cooperate with a backstop extending across the path and limiting outward movement of the plunger. The backstop is slidably endwise inserted in the space between the ends of the side plates. The coil is wound on a bobbin having a skirt portion which cooperates with depending marginal portions of the backstop to retain the coil against dislodgement from the core structure. Interposed between angularly disposed marginal edges of the side plates and underlying marginal portions of the backstop is a pair of strips or pads of elastomeric material, which are received in retaining pockets and serve to absorb the shock of the plunger impacting against the backstop on the return stroke thereof. Each of the pads has a yieldable tab thereon projecting into a notch formed in the marginal edge of a cooperating portion of the assembly for retaining the backstop against dislodgement from the assembly.

The disclosed solenoid is assembled by first permanently securing the side plates and the laminations comprising the stator. The coil is next received in an aperture provided in the stator and side plates. The plunger is then received in the coil, from above, in a direction generally perpendicular to the direction of receipt of the coil in the stator. Finally, the backstop is received beneath a downwardly facing portion of the side plates, above the plunger, in a direction generally perpendicular to the direction of receipt of the coil and the plunger.

DESCRIPTION OF THE DRAWINGS

FIG. 1 is an end elevation view with parts broken away of a solenoid construction in accordance with the present invention;

FIG. 2 is a side elevation view taken in the direction 2—2 of FIG. 1;

FIG. 3 is an exploded perspective view of the several components of the solenoid assembly;

FIG. 4 is a cross sectional side view of the upper portion of another embodiment of the solenoid of the invention; and FIG. 5 is a partial side elevation of the solenoid embodiment shown in FIG. 4.

DESCRIPTION OF THE PREFERRED EMBODIMENTS

The invention is illustrated in FIGS. 1 to 3 in an industrial type solenoid; the major operating elements of which include a magnetic stator or core frame structure 10, a field coil unit 60, and an armature 80 in the form of a reciprocating T-shaped plunger that is magnetically attracted to the core by the magnetic field produced therein by the coil.

The stator frame structure comprises a hollow rectangular stack 12 of soft iron laminations, which are held in alignment and are secured together by rivets 14 extending transversely through the stack. As shown in FIG. 3, the laminations are of substantially C-shaped configuration defining in the stack a centrally located rectangular coil receiving aperture 16 and a narrow channel or plunger receiving slot 18 communicating at one end with the aperture. In the depicted orientation of the stack, the slot 18 opens upwardly between overhanging stator arms 13 and 15 through the upper end of the hollow core structure, between the pole faces 17 and 19 of the overhanging arms, with the bight portion 24 of the stack located at the lower end of the core frame structure opposite slot 18. Aperture 16 and slot 18 extend transversely of the stack and open through opposite sides thereof.

Mounted on opposite sides of the stack of laminations, and forming a part of the stator, is a spaced pair of upwardly extending side plates 26—26, each including an aperture and slot therein of configuration similar to and aligned with the aperture 16 and slot 18 in the core stack. The side plates are assembled with the core stack as a unit by the same rivets 14 that are employed to secure the laminations of the core stack. This expedient not only eliminates the use of separate fastening members for securing the side plates to the core structure, but also avoids additional holes in the stack that would be required for such fastening members. In prior art industrial type solenoids having a backstop, the side plates were secured to the stator as shown in Pat. No. 2,665,397. The holes in the stator through which the fasteners extend to secure the backstop side plates interfered with the magnetic field in the stator and increased the magnetic resistance thereof.

As indicated in FIG. 2, the bight portion of the stack has a centrally located hole 28 therein that extends downwardly therethrough and contains the upper end of a bushing 30 therein. Bushing 30 is adapted to receive a push rod or pin (not shown) for operative association with the solenoid plunger, and extends through aligned central openings provided in a cushioniing pad 32, a mounting base plate 34, and a retaining strap 36. Intermediate the ends of the bushing is an annular flange or collar 38, which is integrally formed thereon and is captured between the mounting base plate 34 and a countersunk or shouldered opening formed in the bottom side of the cushioning pad 32.

The stator is placed on the resilient cushioning pad, which is formed of a piece of rubber-like or other elastomeric, yieldable material and is interposed between the core stack and an upstruck central portion 40 of the base plate. The stator is detachably secured to the pad and base plate by means of a spring retainer strap 36 which holds the cushioning pad 32 firmly in place under slight compression. The strap 36 passes under the upstruck portion of the base plate and extends upwardly about the core stack, the upper end of which has a pair of laterally spaced, transversely extending grooves therein in which the turned over upper ends of the spring strap are detachably received. As shown in FIG. 3 the marginal portions on the opposite sides of the raised central portion 40 of the base plate 34 extend beyond the faces or sides of the core stack to provide a pair of mounting feet 46—46, each of which has a pair of apertures 48—48 therein for attaching the solenoid to a suitable support.

The field coil unit 60 comprises a coil bobbin 62 and a coil winding 64 and is removably received in the central aperture 16 and aligned slot 18 in the core structure, which embraces the coil.

The coil bobbin 62 is a sleeve-like member formed of molded insulating plastic material, such as heat stabilized nylon, having a central passage 63 extending axially therethrough and having a pair of axially spaced flanges 66 and 68 integrally formed thereon. The passage opens through the opposite ends of the bobbin, which is of rectangular shape or cross-section conforming to the shape and size of the transverse slot or passage in the core stack. The flanges are of flat rectangular shape and are contained in spaced planes normal to the longitudinal axis of the liner, imparting a spool-like configuration thereto. The marginal edges of the flanges extend beyond the walls of the centrally located sleeve to form the coil retaining rims of the bobbin spool.

The coil 64 is wound in layers on the bobbin and is confined between the spaced flanges thereof. After the opposite ends of the winding are electrically connected to a pair of pig-tail leads 70—70, which serve to facilitate connection of the solenoid coil in an energizable circuit from an external source of electrical power, the bobbin and coil may be suitably potted or an insulating tape covering may be wrapped about the exterior of the coil.

The field coil unit is slidably inserted into the stator in a direction transversely thereof from either side of the frame structure and extends through and beyond the side plates on the opposite sides thereof. As shown in FIG. 2, the coil is confined in the other two directions of its expanse by the walls of the core stack that bound or define the aperture 16 in which the coil unit is received. Flange 66 is located at the lower end of the bobbin, shown resting on the upper side of the bight portion 24 of the core stack. The other or upper end of the bobbin projects axially upwardly beyond the upper flange 68 to form a rectangular skirt having a pair of laterally extending end walls 72—72 and a pair of longitudinally extending side walls 74—74 and is received in and extends through the plunger aligned slot 18 in the stator.

The two longitudinally spaced part end walls 72—72 of the skirt portion of the coil liner extend above the upper end of the core stack and are reinforced by laterally spaced apart web portions 76—76, bracing the walls 72—72 against the upper flange 68. The two longer or longitudinally extending, laterally spaced apart side walls 74—74 of the bobbin skirt portion extend a lesser distance above or beyond the upper flange 68 than the end walls 72—72 and terminate slightly below the pole faces 17 and 19. Risers, one of which is shown at 78, extending along the longitudinal direction of the upper flange 68 on opposite sides of the coil aperture 63 and integrally formed on the outer surface thereof, abut against the underside of the overhanging arms 13 and 15 of the stator spacing the flange slightly therefrom.

Armature 80 constitutes the movable part of the solenoid and comprises a reciprocating plunger formed of a multiplicity of thin laminations of magnetic material which are riveted together. The plunger is shown as T-shaped having a shank or stem portion 82 and a widened crosshead portion 84. The stem is of rectangular cross-section and is received internally axially of and within the central passage 63 of the coil sleeve after the coil unit has been inserted in the core frame structure. The passageway 63 in the bobbin, in conjunction with a passageway liner, not shown, guides the armature for reciprocating movement.

Energization of the solenoid coil attracts the plunger downwardly to strike the underside of the crosshead portion against the pole faces 17 and 19 of the stator, the shock or impact against which is absorbed by the aforementioned cushioning pad 32. Upon de-energization of the solenoid, the plunger is returned, as by a spring (not shown) associated with the push pin or structure actuated by the solenoid, and impacts against the yieldable backstop 90, which is located above the core stack and across the path of the plunger.

The embodiment of the backstop illustrated in FIGS. 1 to 3 includes a stop plate 90 slidably inserted and retained between the upper ends or extensions of the side plates 26—26, beyond the slotted end of the core stack. The side plates are displaced outwardly from opposite sides or faces of the core stack, and receive the similarly configured stop plate in the expanded space defined between the outwardly inclined portions 50—50, upwardly extending side wall portions 52—52 and inwardly turned upper marginal edges 54—54 provided on each of the side plates. An elongated relief opening 56—56, communicating with the slot 18, is provided in the inclined portion 50—50 of each of the side plates to accommodate insertion of the extension of the bobbin skirt portion above the upper end of the core stack, and to provide sufficient clearance for the plunger to prevent the lower corners of the crosshead thereof from striking against the inclined portions of the side plates. The inturned marginal edges 54—54 of the side plates are centrally notched as shown at 58—58 to form a catch cooperating with an upwardly projecting extended portion of a shock absorbing cushioning pad 110—110; one of which is carried on each side of the stop plate. In addition to their shock absorbing functions, the shock pads serve to hold or lock the stop plate in place between the side plates, as later described.

The backstop member 90 is an inverted generally U-shaped element formed or molded of a piece of plastic insulating material and includes a flat rectangular central web or bight portion 92 bridging a pair of laterally spaced, longitudinally extending leg portions 94—94 depending from the central bight portion. As shown in FIGS. 1 and 2, a centrally located aperture 96 extends transversely through the bight portion, the underside of which has a centrally located rectangular cavity 98 formed therein between the longitudinally spaced ends 97—97 and the laterally spaced depending legs 94—94. The cavity conforms to the shape of the crosshead of the plunger which is guidingly received therein on the return stroke thereof. The opposite longitudinally extending, upper marginal edges of the bight portion of the backstop member are relieved to form a step or shoulder 100—100 spaced from and underlying the inturned marginal edges 54—54 of the side plates 26—26.

The depending leg portions 94—94 of the backstop member extend in juxtaposed position to, and span the distance between the upwardly extending side wall portions 50—50 and 52—52 of the side plates. The lower ends of the leg portions 94—94 conform generally to the contour of the jogged or inclined side plate portions 50—50 which underlie the leg portions and vertically support the stop plate in the depicted orientation of the solenoid.

In accordance with one aspect of the invention, the leg portions of the stop plates are relieved as shown at 102—102 on the inwardly facing sides thereof to receive the extended end walls 72—72 of the coil bobbin skirt portion in the assembled condition of the solenoid. Additionally, the outwardly facing sides of each of the leg portions are relieved inwardly to form an open-faced shallow pocket, one of which is shown in FIG. 3 at 104, between the longitudinally displaced ends thereof, for receiving a corresponding one of the aforementioned shock pads 110.

The shock pads 110 are formed of narrow resilient strips of elastomeric material of rectangular cross-section, and have a thickness approximately equal to the width of the land portions forming the walls of the pockets 104. The lower side and opposite ends of each pad conform to the generally U-shaped configuration of the pockets, which are closed on three sides, including the lower side and the longitudinally displaced ends thereof, and retain the shock pads endwise therebetween. The upper side of each pad projects above the stepped shoulder portion 100 of the stop plate to abut the underside of the inturned edges 54 of the side plates. The pads leave a series of longitudinally displaced, upwardly extending sinusoidal or scallop-shaped projections 112 formed thereon, of which a centrally located one 114 of the projections extends above the other projections, and is formed with substantially straight sides as shown.

After the pads are inserted in their corresponding pockets, the stop plate is slidably inserted endwise between the outwardly displaced upper ends of the side plates 26—26 of the core frame structure. The scallops 112, and extended projection 114 of the pads, are compressed by the overhanging marginal edges 54—54 of the side plates and by the application of a slight downward pressure on the stop plate during insertion thereof, displacing the material of the respective pads longitudinally and laterally inwardly thereof to partially occupy the space or valleys between the scallops. When the stop plate is fully inserted between the side plates, the compressed central projection 114 of each of the shock pads is aligned with its corresponding notch 58 in the inturned upper marginal edges 54—54 of the adjacent side plates, and is released to extend upwardly therethrough with its sides abutting in interlocking engagement against the side walls of the notch 58, so as to catch and prevent dislodgement of the stop plate from the side plates.

As shown in FIG. 1, the end walls 72—72 of the bobbin skirt portion extend above the lower ends of the depending leg portions 94—94 of the backstop member, and are slidably engageably received between and are embraced by the inwardly facing sides 102—102 of the leg portions of the backstop member, to retain the coil unit in place in and against transverse movement relative to the stator. As a result of the described construction, the stop plate is retained against dislodgement between the side plates of the core frame structure and firmly secures the coil unit in proper operating position in and against dislodgement from the stator.

The method and sequence of assembling the solenoid is illustrated in FIG. 3. The side plates 26 are first permanently secured to the laminations comprising the stator 10 by rivets 14, or the like, as described hereinabove. The field coil 60 is next received in the rectangular aperture 16 defined in the stator 10 and side plates 26, in the direction of arrow 61 or from the opposite side. The armature plunger 80 is then received in the slot 18 in the stator 10, from above the stator, in the direction of arrow 81, which is perpendicular to the direction 61 of receipt of the field coil in the stator. Finally, the backstop plate 90 is slid endwise between the inturned marginal edges 54 of the side plates, and the pole faces 17, in the direction of arrow 91, and locked in place by the pads 110 as described hereinabove. The pads are inserted in the pockets 104 prior to assembly of the backstop. It should be noted that the backstop plate 90 must be slid in a direction perpendicular to the direction of assembly of both the armature plunger 80 and the field coil 60, which substantially eliminates assembly errors and provides an exceptionally secure assembly. Further, the sequence insures proper assembly, as each part interlocks with the other.

The embodiment of the industrial solenoid shown in FIGS. 4 and 5 is similar to the embodiment of FIGS. 1 to 3, except that the marginal edges 154 of the side plates 126 in FIGS. 4 and 5 are turned outwardly, and the backstop plate 190 is slid endwise over the marginal edges. The pad receiving pocket 204 is thus defined in the inside of the backstop plate, and the pad 210 is compressed between the lower edge of the pocket and the outer surface of the backstop marginal edge 154. The shock absorbing pad may be provided with a central projection 214, which is received in a slot 158 defined in the edge 154 of the side plates to lock the backstop in position, as described hereinabove. The remaining details of the embodiment shown in FIGS. 4 and 5 may be identical to the embodiment described hereinabove, and have been numbered in the same sequence. The method of assembly of the embodiment shown in FIGS. 4 and 5 is thus identical to the method of assembly described in regard to FIGS. 1 and 3.

The solenoid is comprised of a minimum number of parts, which are assembled into a compact structure without the use of tools and are held together in physical alignment and proper operating relationship by structural interlocking features of the components themselves without the use of additional fastening members. Disassembly of the solenoid structure is likewise facilitated, the coil and/or the backstop member being readily removable from the core assembly without disassembly of the core frame structure.

What is claimed is:

1. In a method of assembling a solenoid having a laminated coil receiving stator with side plates overlying opposite sides of the stator and extending beyond pole faces of the stator to carry a backstop for limiting movement of a solenoid plunger reciprocating between it and the pole faces of the stator, including the following steps, performed in sequence:

(a) permanently securing together in operative relation the side plates and the laminations comprising the stator, (b) receiving the coil and the plunger in the stator, (c) sliding the backstop member endwise between the side plates beneath a downwardly facing portion of each (of the side plates) to bridge between the side plates and retain the backstop member under the impacting force of the plunger, and (d) orienting the backstop member in operative position above the plunger and locking it in such position against unintentional slidable withdrawal from between the side plates.

2. The method defined in claim 1, characterized in that the coil is received in the stator and the plunger is received in the coil in a direction perpendicular to the direction of receipt of the backstop.

3. In a method of assembling a solenoid having laminated coil receiving stator with side plates overlying opposite sides of the stator and extending beyond pole faces of the stator to carry a backstop for limiting movement of a solenoid plunger reciprocating between it and the pole faces of the stator, including the following steps, performed in sequence:

(a) permanently securing together in operative relation the side plates and the laminations comprising the stator;

(b) slidably receiving the coil in an aperture provided in the stator, (c) slidably receiving the plunger in the coil, from above the coil, in a direction generally perpendicular to the direction of the receipt of the coil, and (d) slidably receiving the backstop beneath a downwardly facing portion of each of the side plates, above the stator overlying the plunger, in a direction perpendicular to the direction of receipt of the coil and the plunger.

4. The method of assembly defined in claim 3, characterized in that a pair of resilient shock absorbing pads are disposed in an enclosed slot defined in the backstop member prior to sliding receipt of the backstop member beneath a portion of the side plates.

5. The method defined by claim 1 characterized in that upon orientation of the backstop member in operating position above the plunger simultaneously locking the backstop member in such position.

6. The method defined by claim 1 characterized in that simultaneously with sliding the backstop member endwise between the side plates introducing between the member and said downwardly facing portion of each side plate a resilient shock absorbing pad.

7. The method defined by claim 6 characterized by trapping each resilient shock absorbing pad in a pocket in the backstop member at the time the backstop member is slidably introduced between the side plates to retain the pads against dislodgment.

8. The method defined by claim 7 characterized in that upon orientation of the backstop member in operating position above the plunger simultaneously trapping the pads within portions of the side plates to retain the pads and backstop member against endwise dislodgement from betwen the side plates.

References Cited

UNITED STATES PATENTS

| | | |
|---|---|---|
| 1,756,023 | 4/1930 | Felsenthal. |
| 2,665,397 | 1/1954 | Jencks _____ 335—257 |
| 2,901,677 | 8/1959 | Chessman et al. _____ 335—257 |

JOHN P. CAMPBELL, Primary Examiner

C. E. HALL, Assistant Examiner

U.S. Cl. X.R.

310—23; 335—248, 257